United States Patent
Koizumi

(10) Patent No.: US 12,270,688 B2
(45) Date of Patent: Apr. 8, 2025

(54) OPTICAL FIBER SENSOR AND BRILLOUIN FREQUENCY SHIFT MEASUREMENT METHOD

(71) Applicant: Oki Electric Industry Co., Ltd., Tokyo (JP)

(72) Inventor: Kengo Koizumi, Tokyo (JP)

(73) Assignee: Oki Electric Industry Co., Ltd., Tokyo (JP)

(*) Notice: Subject to any disclaimer, the term of this patent is extended or adjusted under 35 U.S.C. 154(b) by 215 days.

(21) Appl. No.: 18/300,592

(22) Filed: Apr. 14, 2023

(65) Prior Publication Data
US 2024/0053172 A1   Feb. 15, 2024

(30) Foreign Application Priority Data
Aug. 10, 2022   (JP) ................ 2022-127875

(51) Int. Cl.
*G01D 5/353* (2006.01)
*G01D 5/36* (2006.01)

(52) U.S. Cl.
CPC ..... *G01D 5/35332* (2013.01); *G01D 5/35364* (2013.01); *G01D 5/363* (2013.01)

(58) Field of Classification Search
CPC . G01D 5/35332; G01D 5/35364; G01D 5/363
See application file for complete search history.

(56) References Cited

U.S. PATENT DOCUMENTS

| | | | |
|---|---|---|---|
| 2016/0025524 A1* | 1/2016 | Nikles | G01L 1/242 356/73.1 |
| 2016/0290857 A1* | 10/2016 | Koizumi | G01K 11/32 |
| 2019/0094049 A1* | 3/2019 | Iwamura | G01D 5/35335 |
| 2019/0094082 A1* | 3/2019 | Koizumi | G01K 11/32 |

FOREIGN PATENT DOCUMENTS

| | | | |
|---|---|---|---|
| JP | 2016-191659 A | | 11/2016 |
| JP | 2019035724 A | * | 3/2019 |
| JP | 2019-060743 A | | 4/2019 |

OTHER PUBLICATIONS

English machine translation of JP2019035724A (Year: 2019).*
T. Kurashima et al., "Brillouin Optical-Fiber Time Domain Reflectometry", IEICE Trans. Commun., vol. E76-B, No. 4, pp. 382-390, Apr. 1993.

* cited by examiner

*Primary Examiner* — Dominic J Bologna
(74) *Attorney, Agent, or Firm* — Rabin & Berdo, P.C.

(57) ABSTRACT

To reduce costs by adopting a direct modulation system in which a semiconductor laser is directly modulated. An optical fiber sensor includes a light source configured to generate an optical pulse as probe light by a direct modulation system, an optical bandpass filter configured to extract anti-Stokes light that is a component on an anti-Stokes side of Brillouin scattered light from backscattered light generated by the probe light in an optical fiber to be measured, an interference signal acquisition unit configured to generate an interference signal by self-delayed heterodyne interference from the anti-Stokes light extracted at the optical bandpass filter and input to the interference signal acquisition unit and a Brillouin frequency shift acquisition unit configured to acquire a Brillouin frequency shift amount from the interference signal.

5 Claims, 9 Drawing Sheets

OPTICAL FIBER SENSOR AND BRILLOUIN FREQUENCY SHIFT MEASUREMENT METHOD

CROSS REFERENCE TO RELATED APPLICATION(S)

This application is based upon and claims benefit of priority from Japanese Patent Application No. 2022-127875, filed on Aug. 10, 2022, the entire contents of which are incorporated herein by reference.

BACKGROUND

The present invention relates to an optical fiber sensor using Brillouin scattered light and a Brillouin frequency shift measurement method.

With the development of optical fiber communication, distributed optical fiber sensing using an optical fiber itself as a sensing medium has been actively studied. Especially, the optical fiber sensing using scattered light can perform measurement for a long-distance distribution, unlike an electric sensor performing measurement for each point, and thus can measure a physical quantity of an entire object to be measured.

A representative example of distributed optical fiber sensing, capable of measurement for a long-distance distribution, is optical time domain reflectometry (OTDR) in which the time from when an optical pulse is input from one end of an optical fiber until when backscattered light in the optical fiber is received is measured. Examples of backscattering in the optical fiber include Rayleigh scattering, Brillouin scattering, and Raman scattering. Among these, one that measures spontaneous Brillouin scattering is called Brillouin OTDR (BOTDR) (for example, see "T. Kurashima et al., "Brillouin Optical-fiber time domain reflectometry", IEICE Trans. Commun., vol. E76-B, no. 4, pp. 382 to 390 (1993)"). Brillouin scattering is observed at a position shifted toward the Stokes side or the anti-Stokes side by a frequency of about a GHz relative to the central frequency of an optical pulse input to an optical fiber, and a spectrum thereof is called a Brillouin gain spectrum (BGS). A frequency shift of a BGS and a spectral line width thereof are called a Brillouin frequency shift (BFS) and a Brillouin line width, respectively. The BFS and the Brillouin line width vary depending on the material of an optical fiber and the wavelength of an input optical pulse. For example, in the case of a silica-based single-mode optical fiber, it is reported that the BFS amount and the Brillouin line width at a wavelength of 1.55 µm are about 11 GHz and about 30 MHz, respectively. Further, from "T. Kurashima et al., "Brillouin Optical-fiber time domain reflectometry", IEICE Trans. Commun., vol. E76-B, no. 4, pp. 382 to 390 (1993)", the BFS amounts due to strain and temperature change in the single mode fiber are 0.049 MHz/µε and 1.0 MHz/° C., respectively, at a wavelength of 1.55 µm.

In this manner, the BFS is dependent on the strain and the temperature. For this reason, BOTDR can be used for diagnosing deterioration of large-scale structures such as bridges and tunnels, monitoring the temperature of plants, and monitoring places where landslides may occur, and is attracting attention.

Because BOTDR measures a spectrum waveform of spontaneous Brillouin scattered light occurring in an optical fiber, heterodyne detection is normally performed using separately prepared reference light. The intensity of spontaneous Brillouin scattered light is smaller than that of Raleigh scattered light by two to three digits. Therefore, heterodyne detection is effective for improving the minimal light-receiving sensitivity.

Here, because spontaneous Brillouin scattered light is extremely weak, a signal-to-noise (S/N) ratio cannot be sufficiently secured even with heterodyne detection. As a result, averaging processing for improving an S/N ratio is required. The conventional optical-fiber strain measurement apparatus performing BOTDR acquires three-dimensional information related to time, an amplitude, and a frequency. Due to the averaging processing and the acquisition of such three-dimensional information, it is difficult to reduce the measurement time.

Meanwhile, the inventors of this application have proposed an optical-fiber strain measurement apparatus and an optical-fiber strain measurement method that use a self-delayed heterodyne BOTDR (SDH-BOTDR) (for example, see Japanese Patent Application Laid-open No. 2016-191659). In SDH-BOTDR, phases of a received beat signal and a local oscillation signal are compared to observe a change of a BFS as a phase change in the beat signal. In this manner, SDH-BOTDR can directly calculate a BFS without sweeping a frequency, thus achieving high-speed and low-cost measurement.

Moreover, the inventors of this application have also proposed an optical-fiber strain measurement apparatus and an optical-fiber strain measurement method that use a self-delayed homodyne BOTDR as a self-delayed interferometer (for example, see Japanese Patent Application Laid-open No. 2019-060743). The self-delayed homodyne BOTDR not only simplifies the configuration, but also improves an S/N ratio and spatial resolution.

SUMMARY

Here, in the above-described self-delayed homodyne or self-delayed heterodyne (hereinafter, also collectively referred to as self-delayed) BOTDR, the configuration of a transmission unit is substantially the same as that of a transmission unit of a normal BOTDR that is not a self-delayed type. That is, in the conventional self-delayed BOTDR, the light source unit includes a semiconductor laser as a light source, an optical modulator, a polarization scrambler if necessary, and an optical amplifier. In this configuration, an optical pulse is generated by an external modulation system in which continuous light generated by a semiconductor laser is pulsed using an optical modulator. The external modulation system is suitable for generating ultrashort optical pulses of nanoseconds or less, chirp-free optical pulses, or high-quality optical pulses with small chirps.

On the other hand, the external modulation system requires an expensive device used for converting continuous light into an optical pulse, such as an optical modulator, and thus the cost reduction of the optical fiber sensor is difficult.

The present invention has been made in view of the above-described situation. The present invention aims at providing an optical fiber sensor capable of reducing costs by adopting a direct modulation system in which a semiconductor laser is directly modulated, and a Brillouin frequency shift measurement method for generating an optical pulse by the direct modulation system.

To achieve the aim, an optical fiber sensor according to an embodiment of the present invention includes a light source configured to generate an optical pulse as probe light by a direct modulation system, an optical bandpass filter configured to extract anti-Stokes light that is a component on an anti-Stokes side of Brillouin scattered light from backscattered light generated by the probe light in an optical fiber to be measured, a branching unit configured to branch the anti-Stokes light extracted at the optical bandpass filter to two, an interference signal acquisition unit configured to generate an interference signal by self-delayed homodyne interference from one of the anti-Stokes light branched to two at the branching unit and input to the interference signal acquisition unit, an intensity acquisition unit configured to generate an intensity signal indicating an intensity of the anti-Stokes light from the other of the anti-Stokes light branched to two at the branching unit and input to the intensity acquisition unit and a Brillouin frequency shift acquisition unit configured to acquire a Brillouin frequency shift amount from the interference signal and the intensity signal.

Further, the optical fiber sensor according to another preferred embodiment of the present invention includes a light source configured to generate an optical pulse as probe light by a direct modulation system, an optical bandpass filter configured to extract anti-Stokes light that is a component on an anti-Stokes side of Brillouin scattered light from backscattered light generated by the probe light in an optical fiber to be measured, an interference signal acquisition unit configured to generate an interference signal by self-delayed heterodyne interference from the anti-Stokes light extracted at the optical bandpass filter and input to the interference signal acquisition unit and a Brillouin frequency shift acquisition unit configured to acquire a Brillouin frequency shift amount from the interference signal.

Further, a Brillouin frequency shift measurement method according to an embodiment of the present invention includes generating an optical pulse as probe light by a direct modulation system, extracting anti-Stokes light that is a component on an anti-Stokes side of Brillouin scattered light from backscattered light generated by the probe light in an optical fiber to be measured, branching the extracted anti-Stokes light to two, acquiring an interference signal by self-delayed homodyne interference from one of the anti-Stokes light branched to two, acquiring an intensity signal indicating an intensity of anti-Stokes light from the other of the anti-Stokes light branched to two and acquiring a Brillouin frequency shift from the interference signal and the intensity signal.

Further, the Brillouin frequency shift measurement method according to another preferred embodiment of the present invention includes: generating an optical pulse as probe light by a direct modulation system; extracting anti-Stokes light that is a component on an anti-Stokes side of Brillouin scattered light from backscattered light generated by the probe light in an optical fiber to be measured; acquiring an interference signal by self-delayed heterodyne interference from the extracted anti-Stokes light; and acquiring a Brillouin frequency shift from the interference signal. The optical fiber sensor and the Brillouin frequency shift measurement method according to the present invention are capable of reducing costs by adopting the direct modulation system in which a semiconductor laser is directly modulated.

DETAILED DESCRIPTION OF THE EMBODIMENT(S)

Hereinafter, referring to the appended drawings, an embodiment of the present invention will be described. Each drawing is only schematically illustrated to the extent that the present invention can be understood. Moreover, hereinafter, a preferred configuration example of the present invention will be described, and it is merely a preferred example. Therefore, the present invention is not limited to the following embodiment, and many changes or modifications achieving the effects of the present invention are possible without departing from the scope of the configuration of the present invention.

Figure 1:
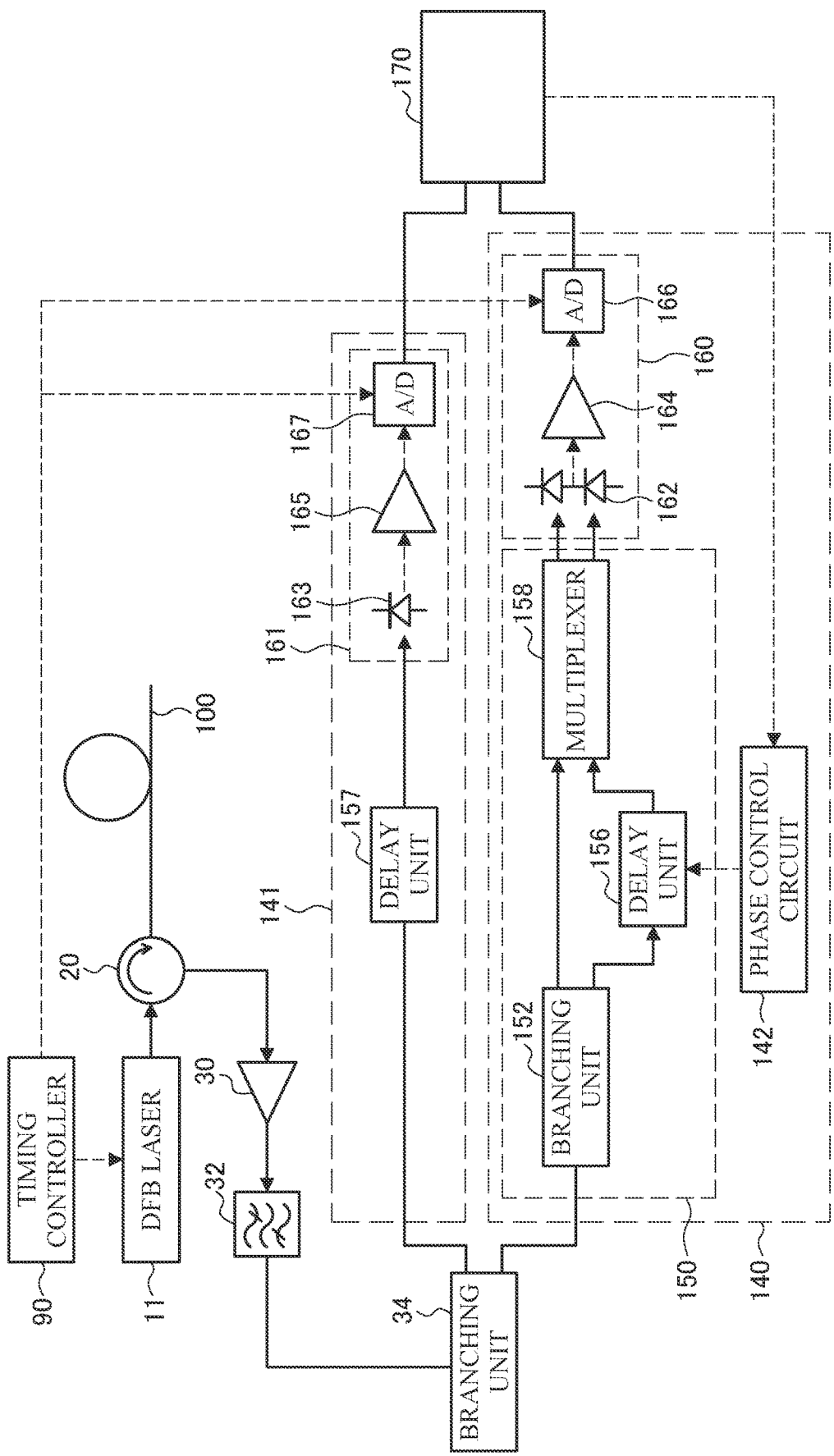
FIG. 1 is a schematic block diagram illustrating an optical fiber sensor according to an embodiment of the present invention.

With reference to FIG. 1, an optical fiber sensor using the self-delayed homodyne BOTDR of the present invention will be described. FIG. 1 is a schematic block diagram illustrating an optical fiber sensor according to an embodiment of the present invention.

The optical fiber sensor includes a semiconductor laser 11, a circulator 20, an optical amplifier 30, an optical bandpass filter 32, a branching unit 34, an interference signal acquisition unit 140, an intensity acquisition unit 140, a BFS acquisition unit 170, and a timing controller 90.

The semiconductor laser 11 generates a rectangular optical pulse from continuous light by the so-called direct modulation system, in accordance with the input of an electric pulse generated at the timing controller 90. As the semiconductor laser 11, a general-purpose distributed feedback (DFB) laser having a line width of several MHz can be used.

A repeating cycle of the optical pulse generated by the semiconductor laser 11 is set to be longer than the time required for the optical pulse to reciprocate through an optical fiber 100 to be measured that is an optical fiber as a measurement target. The optical pulse generated by the semiconductor laser 11 is output as probe light from the semiconductor laser 11.

With reference to FIGS. 2A, 2B, 3A and 3B, waveforms of an optical pulse generated by the external modulation system and of an optical pulse generated by the direct modulation systems will be described.

Figure 2A:
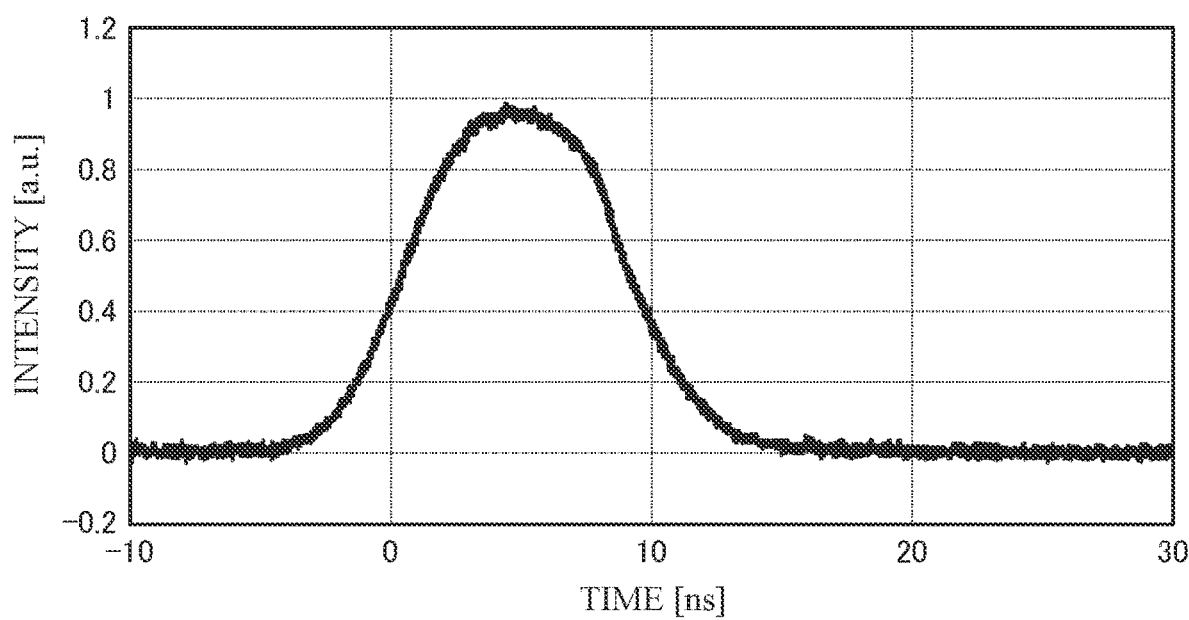
FIG. 2A is a diagram illustrating an example of a time waveform of probe light.
Figure 2B:
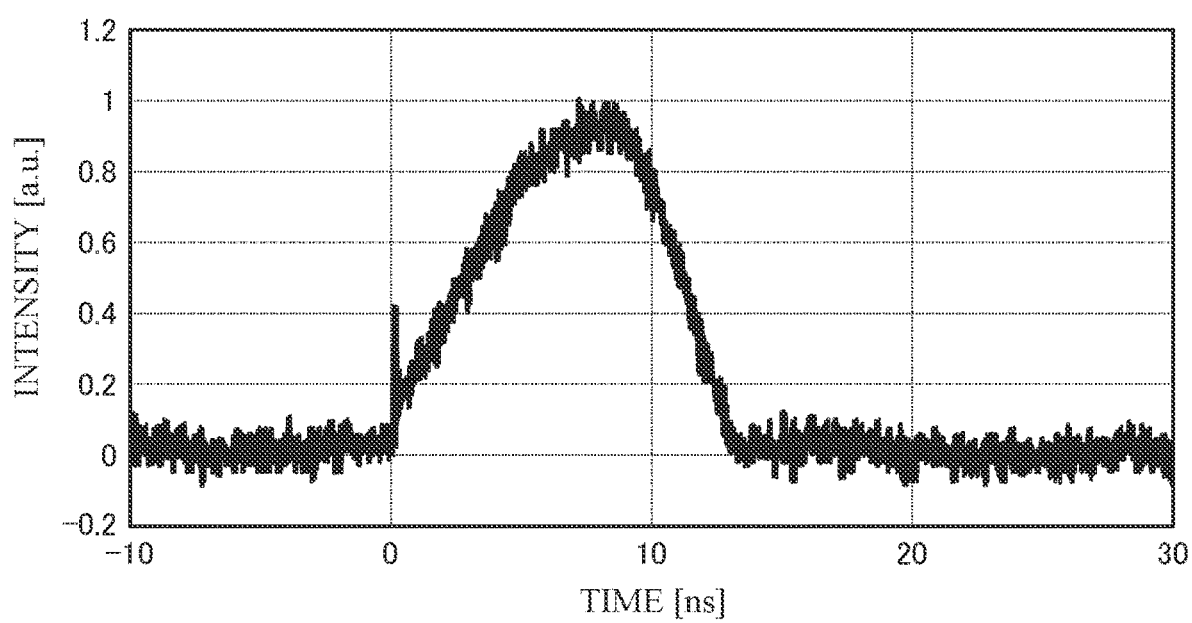
FIG. 2B is a diagram illustrating an example of a time waveform of probe light.

FIGS. 2A and 2B are diagrams illustrating examples of a time waveform of probe light. In FIGS. 2A and 2B, the abscissa denotes time [unit: ns], while the ordinate denotes intensity with an arbitrary unit [a.u.]. FIG. 2A illustrates an optical pulse generated by the external modulation system similarly to the conventional technique, while FIG. 2B illustrates an optical pulse generated by the direct modulation system of the present invention.

Figure 3A:
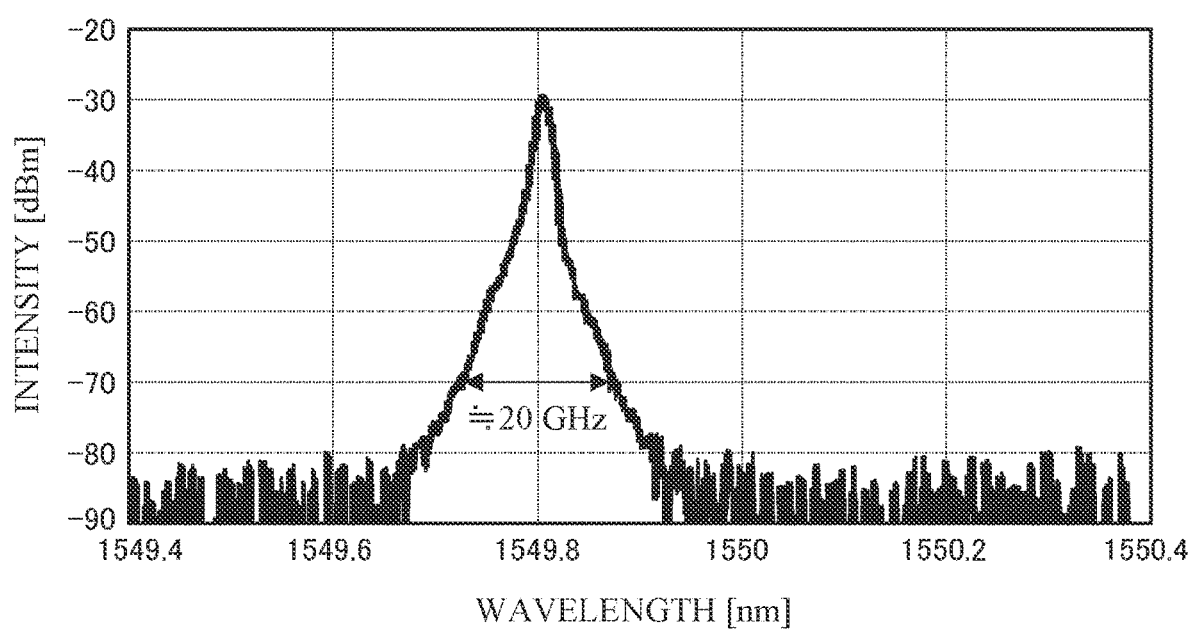
FIG. 3A is a diagram illustrating an example of a spectrum waveform of probe light.
Figure 3B:
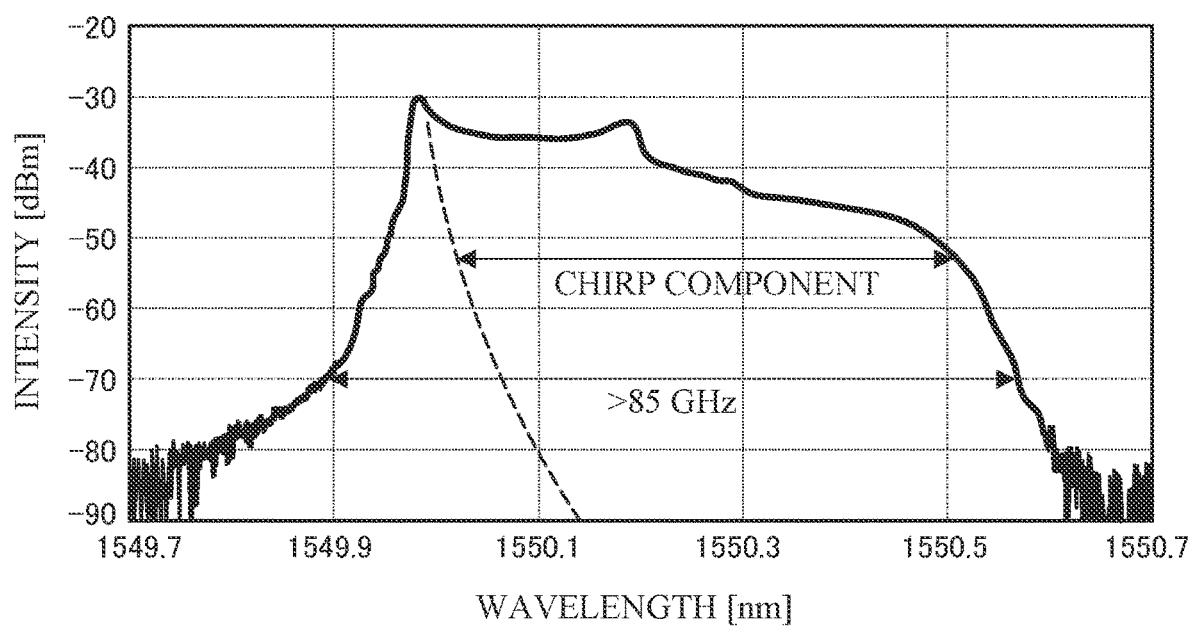
FIG. 3B is a diagram illustrating an example of a spectrum waveform of probe light.

FIGS. 3A and 3B are diagrams illustrating examples of a spectrum waveform of probe light. In FIGS. 3A and 3B, the abscissa denotes a wavelength [unit: nm], while the ordinate denotes intensity [unit: dBm]. FIG. 3A illustrates an optical pulse generated by the external modulation system similarly to the conventional technique, while FIG. 3B illustrates an optical pulse generated by the direct modulation system of the present invention.

As described above, when an optical pulse is generated by the external modulation system, the optical pulse is chirp-free or with small chirps. Thus, the optical spectral width is inversely proportional to the pulse width. Assuming that an optical pulse is a chirp-free Gaussian type pulse, the pulse width $\Delta t$ and the spectral width $\Delta v$ have a relation of $\Delta t \cdot \Delta v \geq 0.441$. Therefore, when the pulse width is 10 ns, the 3 dB spectrum width is about 44.1 MHz. Further, as illustrated in FIG. 3A, the width of the optical spectrum including the base region thereof is approximately 20 GHz, which can be determined to be sufficiently thin.

Meanwhile, when an optical pulse is generated by the direct modulation system, the optical pulse has a strong frequency chirp with carrier variation during modulation. Thus, as illustrated in FIG. 3B, the spectral width extends to 85 GHz or more.

The probe light generated by the laser light source 11 is input to the optical fiber 100 to be measured via the circulator 20. Note that an optical coupler may be used instead of the circulator 20.

The probe light input to the optical fiber 100 to be measured propagates through the optical fiber 100 to be measured. The probe light generates backscattered light while propagating through the optical fiber to be measured. The backscattered light propagates through the optical fiber 100 to be measured in the opposite direction from the direction of the probe light, and is sent to the circulator 20.

The backscattered light generated in the optical fiber 100 to be measured is sent, via the circulator 20, to the optical amplifier 30 formed by, for example, an erbium-doped optical fiber amplifier (EDFA) or the like. The backscattered light amplified at the optical amplifier 30 is sent to the optical bandpass filter 32.

The optical bandpass filter 32 transmits a component on the anti-Stokes side (also referred to as anti-Stokes light) of spontaneous Brillouin scattered light, while blocking other frequency components.

Figure 4A:
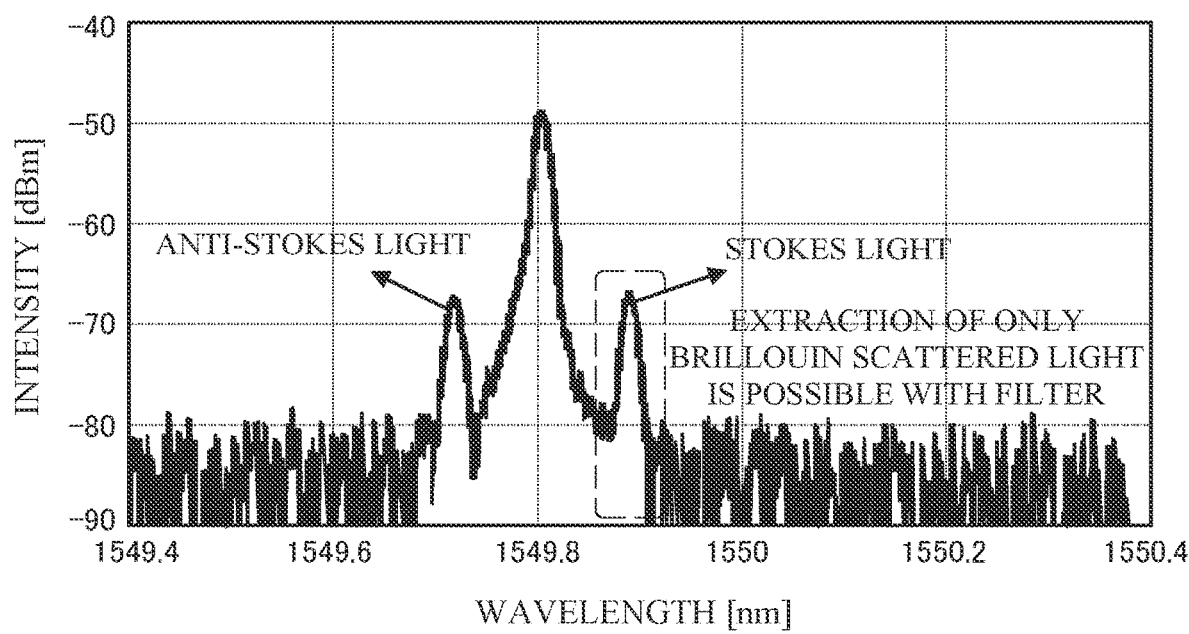
FIG. 4A is a diagram illustrating an example of a spectrum waveform of backscattered light.
Figure 4B:
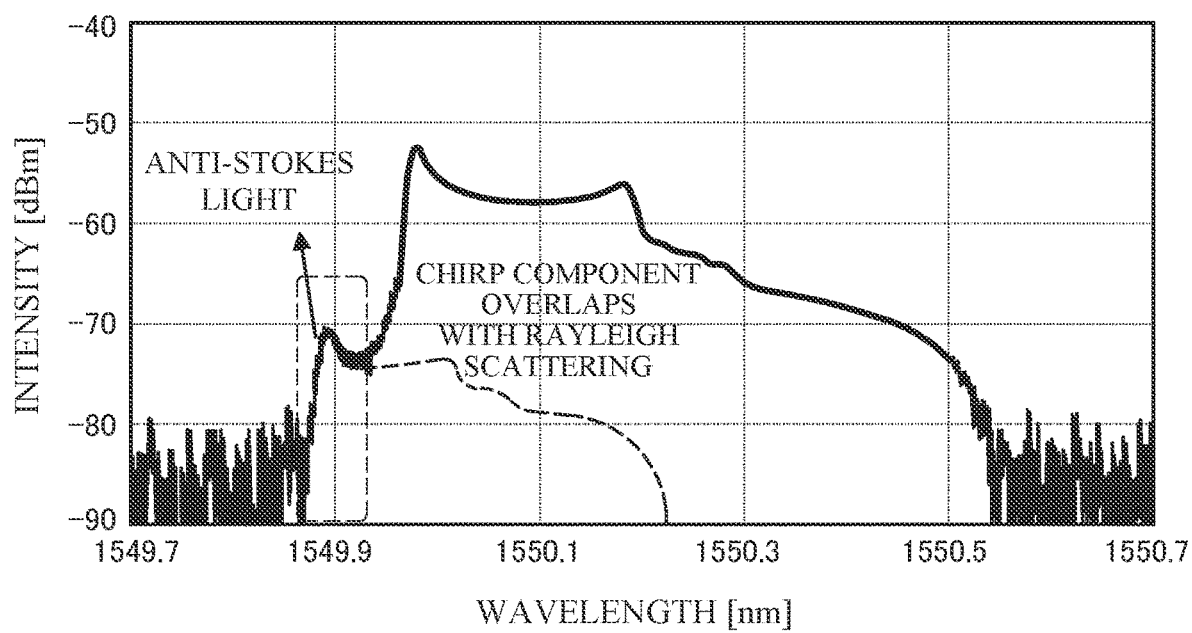
FIG. 4B is a diagram illustrating an example of a spectrum waveform of backscattered light.

With reference to FIGS. 4A and 4B, the spectral waveform of backscattered light will be described. FIGS. 4A and 4B are diagrams illustrating examples of a spectrum waveform of backscattered light. In FIGS. 4A and 4B, the abscissa denotes a wavelength [unit: nm], while the ordinate denotes intensity [unit: dBm]. FIG. 4A illustrates a spectrum waveform of backscattered light generated by the external modulation system similarly to the conventional technique, while FIG. 4B illustrates a spectrum waveform of backscattered light generated by the direct modulation system of the present invention.

As illustrated in FIG. 4A, the backscattered light obtained by the external modulation system has a sufficiently thin spectral width. Thus, the component on the Stokes side of the backscattered light (also referred to as Stokes light) does not overlap with anti-Stokes light. Therefore, it is easy to accurately extract only the Stokes light with the optical bandpass filter 32.

On the other hand, as illustrated in FIG. 4B, in the backscattered light obtained by the direct modulation system, the chirp components of Rayleigh scattered light and Stokes light overlap with each other. Thus, it is difficult to extract only the Stokes light with the optical bandpass filter 32. However, anti-Stokes light can be observed. Thus, in the optical fiber sensor of the present invention, the optical bandpass filter 32 extracts anti-Stokes light, and removes Stokes light and Rayleigh scattered light. The optical fiber sensor of the present invention measures a BFS using anti-Stokes light extracted at the optical bandpass filter 32.

In order to handle a strongly chirped optical pulse as a light source for sensing as in the direct modulation system, it is normally necessary to perform pulse shaping on the probe light so as to remove a chirped component using an optical filter. However, with addition of an optical filter in an optical path through which probe light generated by a light source propagates until it is input to an optical fiber to be measured, the cost of the apparatus is increased.

On the other hand, in the optical fiber sensor of the present invention, even without an optical filter pulsing probe light, the removal of a chirp component and the extraction of Brillouin scattered light are possible only with the optical bandpass filter 32 to which backscattered light is input. Therefore, an optical filter is not necessary around the semiconductor laser 11 that is an optical source. Further, a general-purpose DFB laser can be used as a light source.

The chirp generated in the direct modulation system is a red chirp in which the frequency varies into a decreasing direction (shifts to the long wavelength side) near the peak of an optical pulse of probe light, and the main component of the pulse lies on the short wavelength side. Further, anti-Stokes light is a component on the short wavelength side with respect to the probe light.

As a result, the chirp component generated in the direct modulation system overlaps with Rayleigh scattered light. Thus, the extraction of Anti-Stokes light supposes the removal of the chirp component and Rayleigh scattered light and the extraction of a component of Brillouin scattered light.

The light transmitted through the optical bandpass filter 32 is sent to the branching unit 34. The branching unit 34 branches the light transmitted through the optical bandpass filter 32 to two, and sends one scattered light to the interference signal acquisition unit 140, and the other scattered light to the intensity acquisition unit 141.

The interference signal acquisition unit 140 includes a self-delayed homodyne interferometer 150, an interference light receiving unit 160, and a phase control circuit 142. The self-delayed homodyne interferometer 150 includes a branching unit 152, a delay unit 156, and a multiplexer 158. The branching unit 152 and the multiplexer 158 can be formed by conventionally known arbitrary preferred optical couplers such as 3 dB couplers, for example.

The branching unit 152 branches the light sent to the interference signal acquisition unit 140 to a first optical path and a second optical path.

In this configuration example, the delay unit 156 is provided in the first optical path. The delay unit 156 applies a delay time $\tau$ to the light propagating through the first optical path. Further, the delay unit 156 can change the phase of the propagating light in accordance with an instruction from the phase control circuit 142.

The multiplexer 158 multiplexes light propagating through the first optical path and the second optical path to generate multiplexed light.

The multiplexed light that is interference light generated at the self-delayed homodyne interferometer 150, is sent to the interference light receiving unit 160. The interference light receiving unit 160 receives the multiplexed light and generates an interference signal. The interference light receiving unit 160 includes, for example, a balanced photodiode (PD) 162 and a field-effect-transistor (FET) amplifier 164, and an analog-digital (A/D) converter 166. The multiplexed light sent to the interference light receiving unit 160 is input to the balanced PD 162. The balanced PD 162 generates a balance detection signal as an electric signal from the multiplexed light. The balance detection signal is appropriately amplified at the FET amplifier 164, and then converted into a digital signal at the A/D 166, whereby an interference signal is obtained. The interference signal generated at the interference light receiving unit 160 is sent to the BFS acquisition unit 170.

The intensity acquisition unit 141 includes a delay unit 157 and a light receiving unit 161. The light sent to the intensity acquisition unit 141 is subjected to a given delay at the delay unit 157, and then sent to the light receiving unit 161. The light receiving unit 161 includes, for example, a PD 163, a FET amplifier 165, and an A/D 167. The light sent to the light receiving unit 161 is converted into an electric signal at the PD 163, and then appropriately amplified at the FET amplifier 165. The amplified electric signal is converted into a digital signal at the A/D 167, whereby an intensity signal is obtained. The intensity signal generated at the light receiving unit 161 is sent to the BFS acquisition unit 170.

The BFS acquisition unit 170 can be formed using, for example, a commercially available personal computer equipped with software that realizes the functions described later. Moreover, the BFS acquisition unit 70 may also be formed by a field-programmable gate array (FPGA).

Note that the interference signal generated at the interference light receiving unit 160 is extremely weak. Therefore, averaging processing at an averaging processing means described later is necessary to improve a signal-to-noise (S/N) ratio. This averaging processing is preferably performed by the FPGA for higher speed.

The BFS acquisition unit 170 acquires BFS distribution in the optical fiber 100 to be measured, on the basis of the interference signal received from the interference light receiving unit 160 and the intensity signal received from the light receiving unit 161.

Each processing performed at the BFS acquisition unit 170 for obtaining BFS distribution, including the averaging processing, is conventionally known, as disclosed in Japanese Patent Application Laid-open No. 2019-060743, for example. Thus, the description thereof will be omitted here.

Because the BFS is dependent on the strain and the temperature, the strain and the temperature of the optical fiber 100 to be measured can be acquired using an arbitrary preferred conventionally known technique, after determining a BFS. That is, the optical fiber sensor of the present invention can be applied to a distributed strain and temperature sensor, and the Brillouin frequency shift measurement method of the present invention can be applied to a strain and temperature measurement method.

Figure 5A:
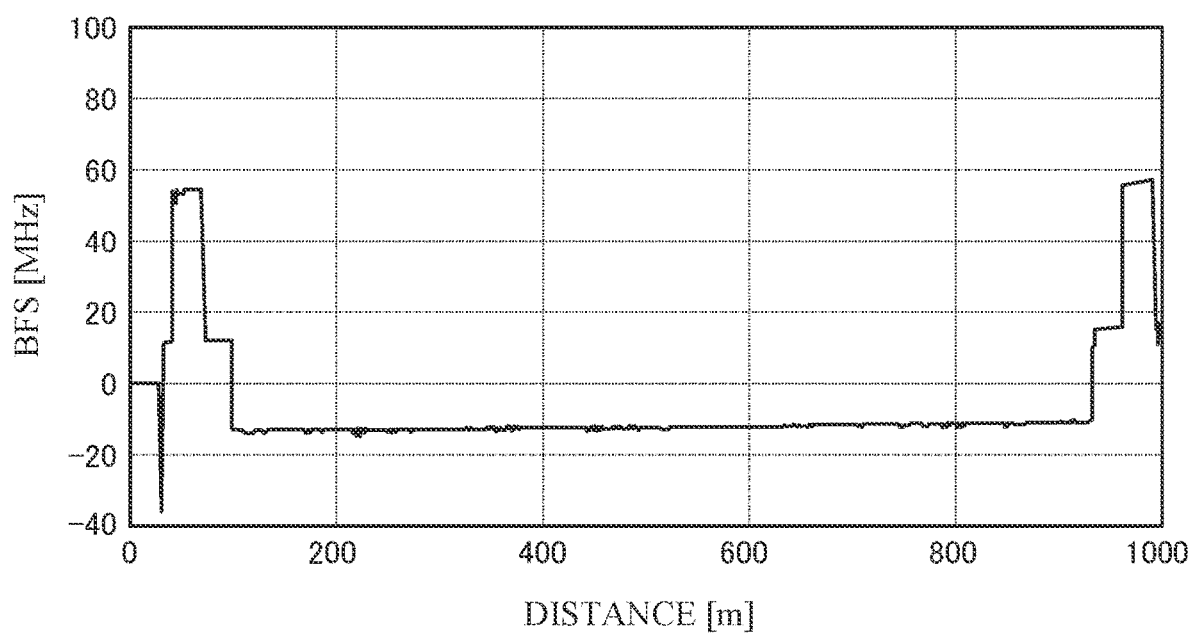
FIG. 5A is a diagram illustrating an example of a BFS waveform.
Figure 5B:
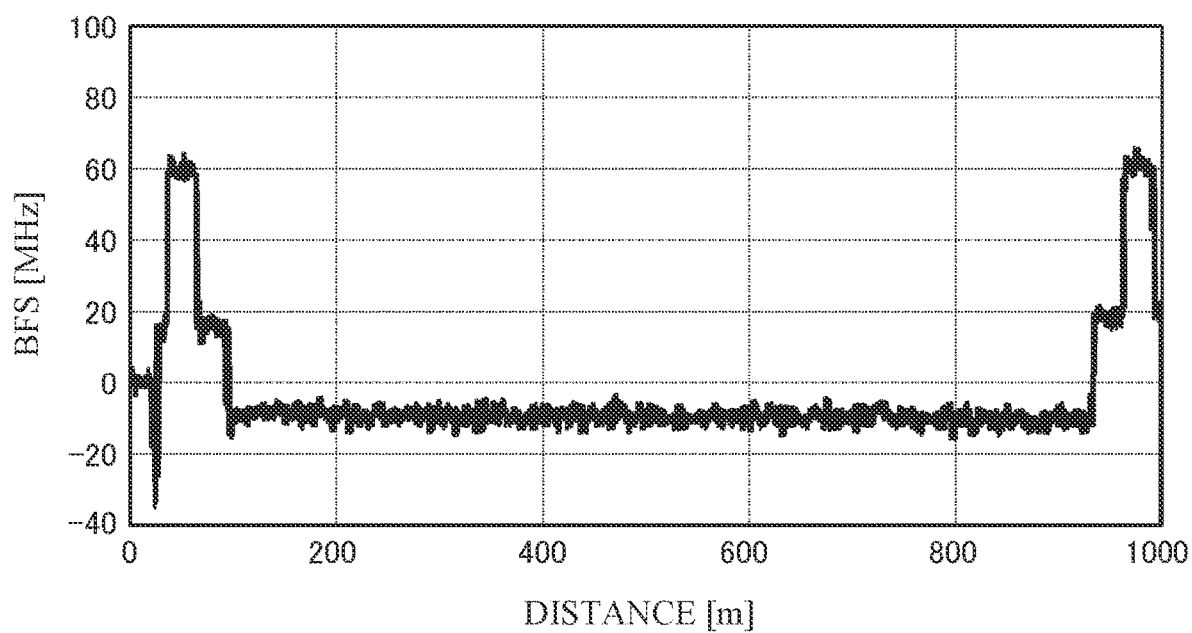
FIG. 5B is a diagram illustrating an example of a BFS waveform.

With reference to FIGS. 5A and 5B, the BFS waveform will be described. FIGS. 5A and 5B are diagrams illustrating examples of a BFS waveform. In FIGS. 5A and 5B, the abscissa denotes a distance from an input end of an optical fiber to be measured [unit: m], while the ordinate denotes a BFS [unit: MHz]. FIG. 5A illustrates a BFS waveform generated by the external modulation system similarly to the conventional technique, while FIG. 5B illustrates a BFS waveform generated by the direct modulation system of the present invention.

FIGS. 5A and 5B illustrate results of the case where a temperature difference of about 45° C. is applied at a position of 42 to 72 m on the near end (input end) side of a 1 km-long optical fiber to be measured, and at a position of 960 to 990 m on the far end (the opposite end from the input end) side thereof. The measurement time is one second. Regarding the measurement accuracy, in the case of the external modulation system illustrated in FIG. 5A, the value of the accuracy 1σ is approximately 0.2 MHz. In the case of the direct modulation system illustrated in FIG. 5B, the value of the accuracy 1σ is approximately 2 MHz. Here, when a BFS is converted into a temperature, 1 MHz=1° C. is substantially established.

The optical fiber sensor of the present invention uses the direct modulation system for generating an optical pulse of probe light, and does not include a relatively expensive optical modulator. Therefore, it is possible to reduce the cost of the optical fiber sensor. Meanwhile, if the external modulation system is used to generate an optical pulse of probe light, it is difficult to reduce the cost of the optical fiber sensor, but the measurement can be performed more accurately.

Therefore, either the optical fiber sensor using the direct modulation system of the present invention or the optical fiber sensor using the external modulation system may be selected depending on a use.

Note that in the optical fiber sensor using the external modulation system, noise during BFS measurement is mainly caused by the deterioration of the S/N due to an optical loss in the optical fiber. Meanwhile, in the optical fiber sensor using the direct modulation system of the present invention, some noise is caused by the variation of the amount of a chirp component due to the fluctuation of an optical frequency in the light source and the fluctuation of a center frequency of a fiber Bragg grating (FBG) used in the optical bandpass filter 32.

Therefore, it is preferable to have a configuration in which a noise level is determined and a warning that the measurement is difficult is given when the noise level exceeds a given level. The warning that the measurement is difficult may be given by arbitrary preferred means, such as display on a display of an operation terminal used by an operator.

Here, the example using the self-delayed homodyne interferometer has been described. However, in the optical fiber sensor of the present invention, a self-delayed heterodyne interferometer may be used for the interference signal acquisition unit. If a self-delayed heterodyne interferometer is used, the intensity acquisition unit 141 is not necessary. Moreover, the self-delayed heterodyne interferometer includes a branching unit, a delay unit, a frequency shifter, and a multiplexer.

The branching unit branches the light sent to the self-delayed heterodyne interferometer to two of the first optical path and the second optical path.

The delay unit is provided in one of the first optical path and the second optical path. The delay unit applies a delay time τ to the light propagating through the delay unit. Further, the frequency shifter is provided in one of the first optical path and the second optical path. The frequency shifter gives a frequency shift to the light propagating through the frequency shifter.

The multiplexer multiplexes light propagating through the first optical path and the second optical path to generate multiplexed light. Also in this case, the direct modulation system is used to generate an optical pulse of probe light, and a relatively expensive optical modulator is not provided. Therefore, even when the self-delayed heterodyne interferometer is used, the cost can be reduced using the direct modulation system, as compared with the case of the conventional optical fiber sensor with a self-delayed heterodyne interferometer that uses the external modulation system. Because an optical fiber sensor including a self-delayed heterodyne interferometer is provided with a frequency shifter in the interferometer, the self-delayed homodyne interferometer is more effective from the viewpoint of cost reduction.

What is claimed is:

1. An optical fiber sensor, comprising:
    a light source configured to generate an optical pulse as probe light by a direct modulation system;
    an optical bandpass filter configured to extract anti-Stokes light that is a component on an anti-Stokes side of Brillouin scattered light from backscattered light generated by the probe light in an optical fiber to be measured;
    a branching unit configured to branch the anti-Stokes light extracted at the optical bandpass filter to two;
    an interference signal acquisition unit configured to generate an interference signal by self-delayed homodyne interference from one of the anti-Stokes light branched to two at the branching unit and input to the interference signal acquisition unit;
    an intensity acquisition unit configured to generate an intensity signal indicating an intensity of the anti-Stokes light from the other of the anti-Stokes light branched to two at the branching unit and input to the intensity acquisition unit; and
    a Brillouin frequency shift acquisition unit configured to acquire a Brillouin frequency shift amount from the interference signal and the intensity signal.

2. The optical fiber sensor according to claim 1, wherein a warning is given when noise in the probe light that is caused by variation of a chirp component of the optical pulse exceeds a given level.

3. An optical fiber sensor, comprising:
    a light source configured to generate an optical pulse as probe light by a direct modulation system;
    an optical bandpass filter configured to extract anti-Stokes light that is a component on an anti-Stokes side of Brillouin scattered light from backscattered light generated by the probe light in an optical fiber to be measured;
    an interference signal acquisition unit configured to generate an interference signal by self-delayed heterodyne interference from the anti-Stokes light extracted at the optical bandpass filter and input to the interference signal acquisition unit; and
    a Brillouin frequency shift acquisition unit configured to acquire a Brillouin frequency shift amount from the interference signal.

4. A Brillouin frequency shift measurement method, comprising:
    generating an optical pulse as probe light by a direct modulation system;
    extracting anti-Stokes light that is a component on an anti-Stokes side of Brillouin scattered light from backscattered light generated by the probe light in an optical fiber to be measured;
    branching the extracted anti-Stokes light to two;
    acquiring an interference signal by self-delayed homodyne interference from one of the anti-Stokes light branched to two;
    acquiring an intensity signal indicating an intensity of anti-Stokes light from the other of the anti-Stokes light branched to two; and
    acquiring a Brillouin frequency shift from the interference signal and the intensity signal.

5. The Brillouin frequency shift measurement method according to claim 4, further comprising:
    giving a warning when noise in the probe light that is caused by variation of a chirp component of the optical pulse exceeds a given level.

* * * * *